United States Patent
Holstun et al.

(10) Patent No.: US 9,774,878 B2
(45) Date of Patent: Sep. 26, 2017

(54) ENCODING INFORMATION IN A GRAPHICAL ELEMENT OF AN IMAGE

(71) Applicant: HEWLETT-PACKARD DEVELOPMENT COMPANY, L.P., Houston, TX (US)

(72) Inventors: Clayton L. Holstun, San Marcos, CA (US); Eric G. Wiesner, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/023,929

(22) PCT Filed: Sep. 30, 2013

(86) PCT No.: PCT/US2013/062644
§ 371 (c)(1),
(2) Date: Mar. 22, 2016

(87) PCT Pub. No.: WO2015/047400
PCT Pub. Date: Apr. 2, 2015

(65) Prior Publication Data
US 2016/0269736 A1   Sep. 15, 2016

(51) Int. Cl.
*H04N 19/467* (2014.01)
*H04N 1/32* (2006.01)
(Continued)

(52) U.S. Cl.
CPC ......... *H04N 19/467* (2014.11); *G06T 1/0021* (2013.01); *G06T 11/60* (2013.01); *H04N 1/32149* (2013.01); *G06T 2201/0061* (2013.01)

(58) Field of Classification Search
CPC ............. H04N 19/467; H04N 1/32149; H04N 1/32144
See application file for complete search history.

(56) References Cited

U.S. PATENT DOCUMENTS

| 5,327,260 A | 7/1994 | Shimomae et al. |
| 5,596,659 A | 1/1997 | Normile et al. |

(Continued)

FOREIGN PATENT DOCUMENTS

| EP | 1 591 948 | 11/2005 |
| KR | 20050112098 A | 11/2005 |

(Continued)

OTHER PUBLICATIONS

Fan, G. et al., "Postprocessing of Low Bit-rate Wavelet-Based Image Coding Using Multiscale Edge Characterization," (Research Paper), IEEE Transactions on Circuits & Systems for Video Technology, Dec. 2001, 10 pages.

(Continued)

*Primary Examiner* — Christopher D Wait
(74) *Attorney, Agent, or Firm* — HP Inc. Patent Department

(57) ABSTRACT

In an example, a processor-readable medium stores code representing instructions that when executed by a processor cause the processor to receive an image, a graphical element, and embedding information. The processor further encodes a binary value representing the embedding information into the graphical element. The zeros and ones from the binary value are distinguished in the graphical element by a difference in luminance values applied to segments of the graphical element. The processor further combines the encoded graphical element with the image without altering the image.

13 Claims, 6 Drawing Sheets

(51) Int. Cl.
*G06T 1/00* (2006.01)
*G06T 11/60* (2006.01)

(56) References Cited

U.S. PATENT DOCUMENTS

| | | | |
|---|---|---|---|
| 5,825,917 | A | 10/1998 | Suzuki |
| 5,838,830 | A | 11/1998 | Qian et al. |
| 5,946,414 | A | 8/1999 | Cass et al. |
| 6,028,608 | A | 2/2000 | Jenkins |
| 2002/0157105 | A1 | 10/2002 | Vienneau et al. |
| 2002/0172395 | A1 | 11/2002 | Foote et al. |
| 2006/0118612 | A1* | 6/2006 | Christoffersen .......... A61J 1/06 235/375 |
| 2010/0128290 | A1 | 5/2010 | Fan et al. |
| 2010/0128320 | A1* | 5/2010 | Fan .................... H04N 1/32203 358/3.28 |
| 2014/0008436 | A1* | 1/2014 | Boury ..................... G06K 7/14 235/437 |

FOREIGN PATENT DOCUMENTS

| | | |
|---|---|---|
| KR | 20060031681 A | 4/2006 |
| KR | 20060045712 A | 5/2006 |

OTHER PUBLICATIONS

Husset~ "Luminance-based Embedding Approach for Color Image Watermarking" ~ I.J. Image, Graphics and Signal Processing~ 2013~ pp. 49-55.

Lusson et al~ "A Novel Approach to Digital Watermarking, Exploiting Colour Spaces" ~ Signal Processing 93~ 2013 pp. 1268-1294.

Shih~ Chapter 12~ "Image Watermarking" ~ Image Processing and Recognition~ 2010~ 30 pages.

* cited by examiner

ENCODING INFORMATION IN A GRAPHICAL ELEMENT OF AN IMAGE

BACKGROUND

Marking or embedding printed articles such as documents, images, packaging, and so on, with machine-readable information has a variety of applications, including document identification and authentication, copy prevention, counterfeit prevention, copyright protection, document organization, and so on. Example forms that are often used to embed machine-readable information into printed articles include watermarks and barcodes. More recently, embedded machine-readable information is being used as a way to link additional, related content to printed articles. For example, in mobile tagging, a barcode printed on a document or image can be scanned by a smartphone in order to link the smartphone user to a related online digital experience (e.g., a video, additional documents and images, etc.). Instead of using the conventional black and white "line" barcode, this tagging method typically uses a more sophisticated two-dimensional barcode, such as a QR (quick response) Code or a tag barcode that can incorporate full-color custom images, such as a company logo.

Barcodes and other prior methods of encoding data are generally effective in providing machine-readable information on printed documents. Some methods enable the information to be hidden or otherwise unnoticeable to a user, while in other methods the information is readily perceivable and sometimes even comprehendible by the user. In general, prior methods of embedding machine-readable information in a document usually involve either altering the document content (e.g., altering an image) to hide the information, or using at least some surface area of the document that could otherwise be used for text or other images.

BRIEF DESCRIPTION OF THE DRAWINGS

The present embodiments will now be described, by way of example, with reference to the accompanying drawings, in which.

DETAILED DESCRIPTION

Overview

Figure 1:
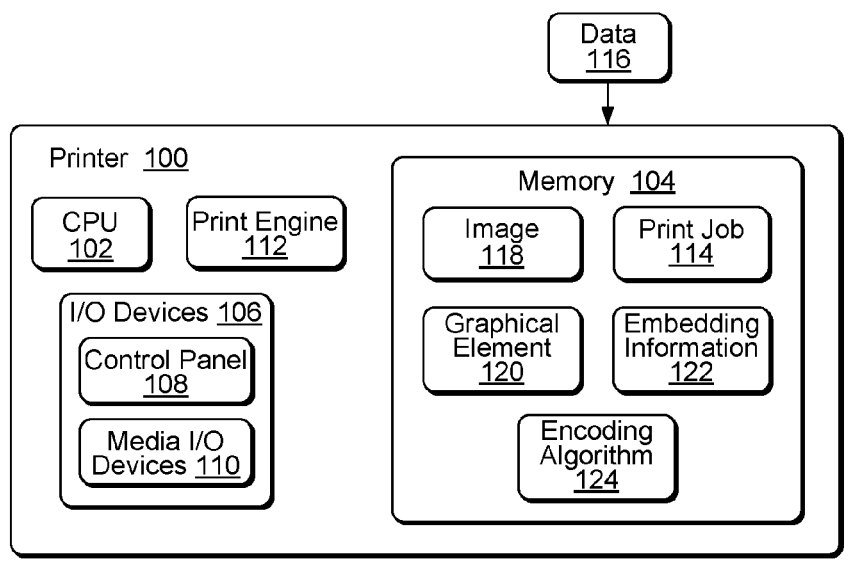
FIG. 1 illustrates a system implemented as a printer that is suitable for encoding information into a graphical element of a printed image or other printed article.

As noted above, various methods of marking or embedding printed articles (e.g., documents, images, packaging) with machine-readable information have been used to organize, protect, authenticate, and enhance such printed articles. While the information encoded and embedded in the printed article can be read and decoded by an appropriate device, depending on the method used, the information may be invisible or mostly unnoticeable to a user, or it may be readily perceivable and even comprehendible by the user. Thus, the embedded information often either alters the original article in some manner, or it uses or visibly covers up some of the surface area of the printed article. Embedded information that is visible to the user can be a distraction from the subject matter of the printed article.

In addition to potentially altering and/or covering the printed article, existing methods of embedding information can have other challenges. For example, some methods are useful for particular image types, making it difficult to select an appropriate algorithm to embed the information, while other methods are not applicable to both color images and black and white images, which excludes their use with black and white printing devices. In addition, some methods use complex calculations to embed and detect the information.

Example methods and systems discussed herein provide for encoding and embedding machine-readable information into an element of a printed image or other printed article which is not visually perceptible to the human eye and does not use or impinge on surface area of the original image. A message or other information to be embedded in an image is encoded into a graphical element which is combined with the image. An encoding algorithm formats the graphical element in size and shape based on the size and shape of the image. The encoding algorithm determines the number and manner of digital transitions needed to digitally express the information to be embedded, and then partitions the graphical element into an appropriate number of segments to accommodate the number of digital transitions. The algorithm encodes the digital information bit by bit into the segments of the graphical element by varying color space values (e.g., luminance, chrominance, hue angle) of adjacent segments within the graphical element. The graphical element containing the encoded information is then combined with the original image in a manner that does not alter the image or cover surface area of the image. The image with the encoded graphical element is printed, and the encoded information can be read and decoded by an appropriate device, such as a scanner, a camera phone, digital glasses, and so on, but is otherwise imperceptible to a user's eye.

In one example, a processor-readable medium stores code representing instructions that when executed by a processor cause the processor to receive an image, a graphical element, and embedding information. The processor partitions the graphical element into segments to accommodate a binary numerical value that represents the embedding information. The processor pre-determines locations along the graphical element for placement of binary values from the binary numerical value, and encodes the binary numeric value into the graphical element as a plurality of data carrying segments, with the segments comprising a plurality of different color-space values.

In another example, a processor-readable medium stores code representing instructions that when executed by a processor cause the processor to receive an image, a graphical element, and embedding information. The processor further encodes a binary value representing the embedding information into the graphical element. The zeros and ones from the binary value are distinguished in the graphical element by a difference in luminance values applied to segments of the graphical element. The processor further combines the encoded graphical element with the image without altering the image.

Illustrative Embodiments

FIG. 1 illustrates a system 100 implemented as printer 100 that is suitable for encoding information into a graphical element of a printed image or other printed article. Printer 100 is intended to represent any of a variety of conventional printing devices, such as a laser printer, an inkjet printer, an electrophotographic printer, a single or multi-function printer, a large or small format printer, and so on. Printer 100 generally includes components of a standard computing device, such as one or more processors (CPU) 102, and a memory 104. A memory 104 typically includes both volatile (i.e., RAM) and nonvolatile (e.g., ROM, hard disk, floppy disk, CD-ROM, etc.) memory components. The memory components of memory 104 comprise non-transitory computer/processor-readable media that provide storage of computer/processor-executable coded instructions, such as program modules, applications, algorithms, data structures, and other data.

Printer 100 also includes various input/output (I/O) devices 106. For example, I/O devices 106 on printer 100 may include control panel 108 with a touch-sensitive display screen that implements an interactive key pad, icons and/or virtual buttons, and other text and graphics of the screen. A touch-sensitive display screen enables user interaction with the printer 100 to control various printer functions and printer settings. Other I/O devices 106 on a printer 100 include media input/output devices 110 comprising data ports, media trays and media rolls. In general, a printer 100 generates printed output through a print engine 112 that translates commands from a print job 114 into a printable image or other printable article that it renders onto print media (e.g., paper) from a media I/O device 110.

Printer 100 may receive data 116 from a host system, such as a computer, over a wired or wireless link (not shown), or it may receive data 116 through a media I/O data port 110. Data 116 is stored, at least temporarily, in a component of memory 104. Data 116 represents, for example, an image 118 or other article, document, or file to be printed. As such, data 116 forms a print job 114 for printer 100 that includes one or more print job commands and/or command parameters that control print engine 112 for printing the job 114. Using data 116, a processor 102 in printer 100 controls the timing and/or patterning of print material (e.g., ink, toner) deposited onto print media (e.g., paper) by print engine 112 to form characters, symbols, and/or other graphics or images on the print media.

In some implementations, data 116 additionally represents a graphical element 120 that can include, for example, an image border, a text box, or various clip art. Data 116 may also include embedding information 122, which is information that is to be embedded within a graphical element 120. Embedding information 122 typically relates to an image 118 to be printed, and can include any type of message about the image 118, link to additional content related to the image, identification of the image, authentication of the image, and so on. In one implementation, printer 100 includes an encoding algorithm 124 stored in memory 104. The encoding algorithm 124 comprises instructions executable on processor 102 to encode and embed the embedding information 122 within a graphical element 120, and to combine the graphical element 120 with a printed image 118.

Figure 2:
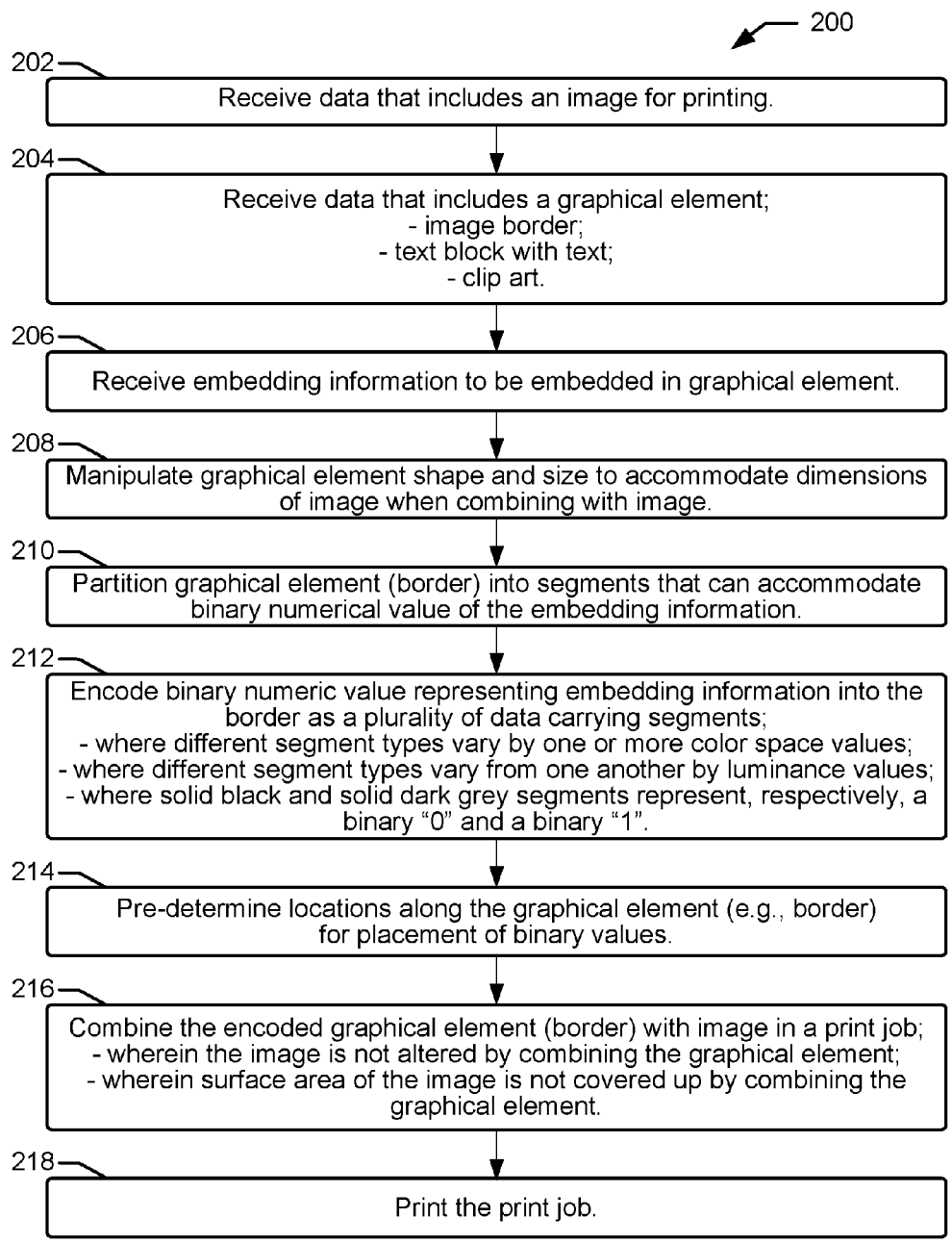
FIG. 2 shows a flow diagram that illustrates a process for encoding and embedding information within a graphical element.
Figure 3:
FIG. 3 shows an example of an image received by printer for printing.

FIG. 2 shows a flow diagram 200 that illustrates a process implemented by encoding algorithm 124 for encoding and embedding the information 122 within a graphical element 120, and for combining the graphical element 120 with a printed image 118. Referring now to FIGS. 1 and 2, printer 100 receives data 116, including an image 118 for printing (step 202 in FIG. 2). FIG. 3 shows an example of an image 118 received by printer 100 for printing. The printer also receives data 116 including a graphical element 120 and embedding information 122 (steps 204 and 206 in FIG. 2). In some examples, one or more graphical elements 120 and other data may be previously and/or permanently stored within the memory 104 of printer 100.

Figure 4:
FIG. 4 shows an example of a graphical element implemented as a border around an image.

FIG. 4 shows an example of a graphical element 120 implemented as a border 120 around an image 118. As shown in FIG. 4, the border 120 appears to be a solid black border that has been combined with and surrounds the printed image 118. Thus, the encoding algorithm 124 executing on processor 102 manipulates the graphical element 120 such that it is the appropriate shape and size to be combined with the image 118 (step 208 in FIG. 2). For example, as shown in FIG. 4, if the graphical element 120 is a border to be added to an image 118 when printed, the encoding algorithm 124 adjusts the size and shape of the border according to the dimensions of the image 118. In another example, a graphical element 120 that comprises a text box will be appropriately sized to be joined to the image 118 when printed.

Figure 5:
FIG. 5 shows an example of a border around an image, where the border illustrates four different segment types.

As just noted, the border 120 surrounding image 118 in FIG. 4 appears to be solid black. In reality, however, the border 120 is partitioned into segments that each comprise one of four different segment types. FIG. 5 shows an example of the border 120 around an image 118, where the border 120 illustrates the four different segment types (500, 502, 504, 506). The four different segment types include segments that vary from one another by one or more color space values (e.g., LCH, LAB, RGB, color space). In one example, using the LCH color space (luminance, chrome, hue), the four different segment types may have varying luminance values. Thus, as shown in FIG. 5, the four different segment types can include segments that are solid black 500, solid dark grey 502, black to grey gradient 504, and grey to black gradient 506. A solid black segment 500 is black from one end to the other, and can therefore be expressed as having a luminance value from 0 to 0 (zero to zero) on a scale of 0 to 255, where 0 is black and 255 is white. A solid dark grey segment 502 is dark grey from one end to the other, and can therefore be expressed as having a luminance value from 30 to 30 on a scale of 0 to 255. A black to grey gradient segment 504 changes from black at one end to grey at the other, and can therefore be expressed as having a luminance value from 0 to 30 on a scale of 0 to 255. A grey to black gradient segment 506 changes from grey at one end to black at the other, and can therefore be expressed as having a luminance value from 30 to 0 on a scale of 0 to 255. While a solid black and grey within the LCH color space have been used as an example for the border 120, another color space can also be used. For example, the border 120 could just as easily be a border of solid red (i.e., 255,0,0 in RGB color space) going to slightly less chromatic red (255,30,30).

The luminance values of the segments shown in FIG. 5 have been exaggerated in order to illustrate and distinguish between the four different segment types (500, 502, 504, 506) to the human reader. In reality, these differences in luminance values would not be so pronounced and would not be perceptible to the human eye. However, the differences in luminance values are detectible by an appropriate machine device, such as a scanner, a camera phone, digital glasses, and so on. Consequently, information such as embedding information 122 can be digitally encoded into the segments of border 120 (or other graphical element 120) in a manner that does not alter the image 118 and is unnoticeable to a user. Therefore, in addition to manipulating the size and shape of the graphical element 120 (e.g., border 120) as noted above, the encoding algorithm 124 partitions the border 120 into segments that can accommodate the embedding information 122 in binary form (step 210 in FIG. 2). For example, if the digital expression of the embedding information 122 is a 64 bit binary numeric value, the encoding algorithm 124 partitions the border 120 into at least enough segments to enable each of the 64 bits to be expressed with one segment of the graphical element 120. Thus, in one example, a 64 bit numeric value representing embedding information 122 would result in the border 120 having at least 64 segments around the image 118. The encoding algorithm 124 encodes the binary numeric value representing the embedding information 122 into the border 120 as a plurality of data carrying segments (step 212 in FIG. 2), where different segment types vary from one another by a color space value such as luminance, in the LCH color space, and where the solid black 500 and solid dark grey 502 segments represent, respectively, a binary "0" (zero) and a binary "1" (one). In addition to the 64 segments representing the digitized embedding information 122, the encoding algorithm 124 includes transition segments (i.e., black to grey gradient 504, and grey to black gradient 506) in the border 120 that transition between the solid black 500 and solid dark grey 502 segments. The gradual transitions between solid black and solid dark grey segments provided by the black to grey gradient 504 and a grey to black gradient 506 help make the embedded information 122 imperceptible to the human eye.

Figure 6:
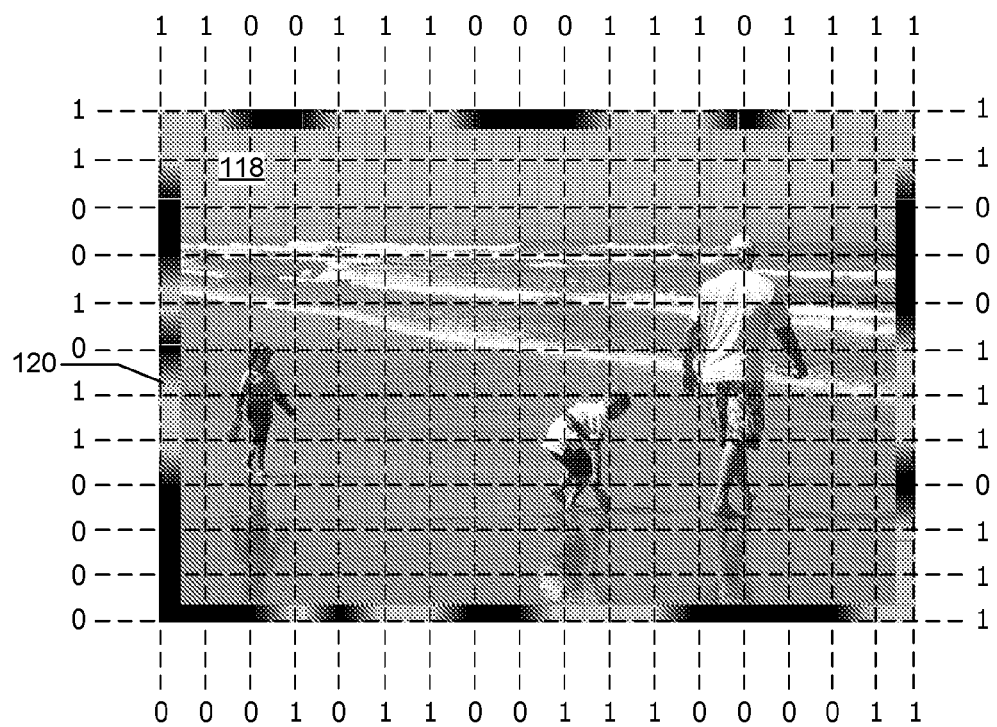
FIG. 6 shows a grid superimposed over an image having a border encoded with embedding information

FIG. 6 shows a grid superimposed over an image 118 having a border 120 encoded with embedding information 122. The grid represents pre-determined locations along the border 120 at which each of the binary values representing the digitized embedding information 122 is embedded. As shown in FIG. 6, each "0" lines up with a solid black segment 500 of the border 120 and each "1" lines up with a solid grey segment 502 of the border 120. Thus, in addition to partitioning the border 120 into segments to accommodate a binary numeric value that represents the embedding information 122, and encoding the binary numeric value into the segments, the encoding algorithm 124 pre-determines the locations along the border 120 where binary values are located (step 214 in FIG. 2). Conversely, in order to extract the digitized embedding information 122 from the encoded border 120 around a printed image 118, a device such as a scanner (or other suitable device such as a camera phone or digital glasses) determines a binary darkness value (i.e., a black or grey value) at each of the predetermined locations. The binary darkness values from each location enable the scanner to reconstruct the binary numeric value that represents the embedding information 122. The algorithm 124 can then determine the embedding information 122 prom its binary numeric value.

Upon partitioning the border into segments, encoding embedding information 122 into the segments, and pre-determining the locations along the border for placement or embedding of the information 122, the encoding algorithm 124 combines the encoded border 120 with image 118 in a print job 114 (step 216 in FIG. 2) and prints the job 114 (step 218 in FIG. 2). The combining of the encoded border 120 with the image 118 does not alter the image and does not cover any surface area of the image 118.

Figure 7:
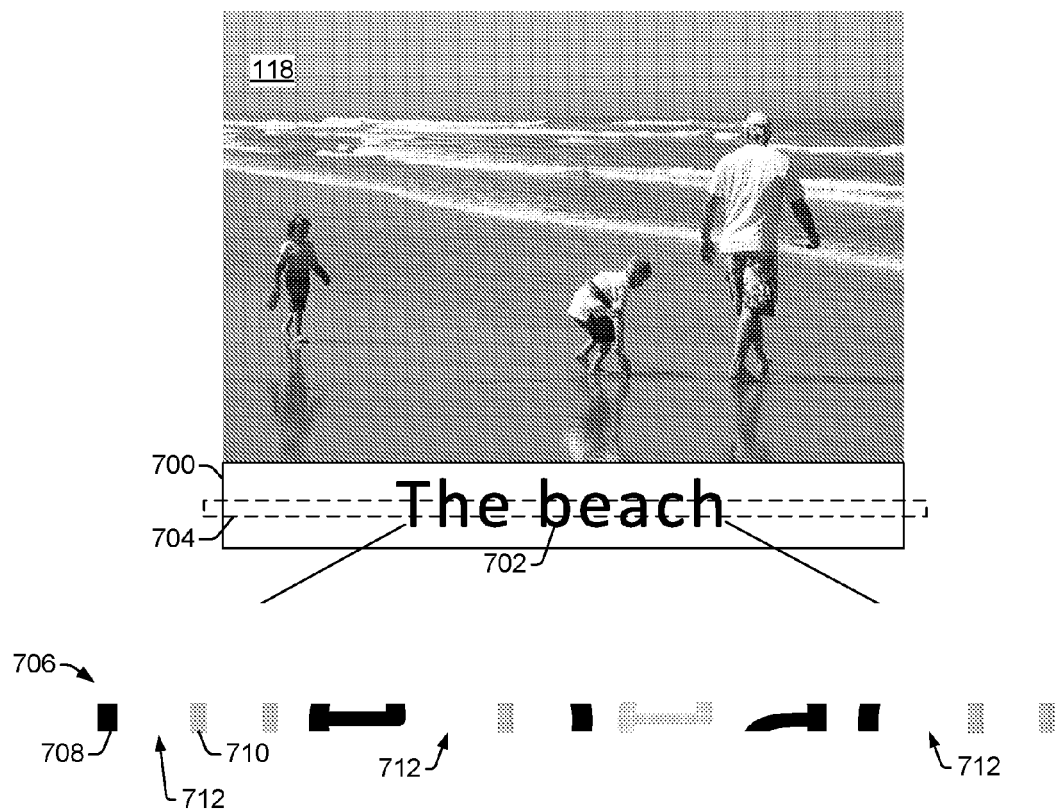
FIG. 7 shows an example of a graphical element implemented as a text block encoded with information that is combined and printed with an image.

While a border 120 is used in the above description, and related figures, as the graphical element 120 into which information 122 is encoded/embedded, a variety of other types of graphical elements 120 are possible and contemplated within this disclosure. FIG. 7 shows an example of a graphical element 120 implemented as a text block 700 that is combined and printed with an image 118. In a manner similar to that discussed above regarding the border 120, the text 702 within a text block 700 can be segmented as indicated by dashed line 704. The text segments 706 can then be encoded with a binary numerical value representing embedding information 122 by varying one or more color space values between neighboring segments 706, such as luminance, chroma, or hue, within an LCH color space. Thus, a segment 708 might be solid black, encoding a binary value of "0", while a neighboring segment 710 might be solid dark grey, encoding a binary value of "1", and so on. In this implementation, where the segments (e.g., 708, 710) of the graphical element 120 are not immediately adjacent to one another, the small gaps 712 or empty spaces between the segments help make the embedded information 122 imperceptible to the human eye.

Figure 8A:
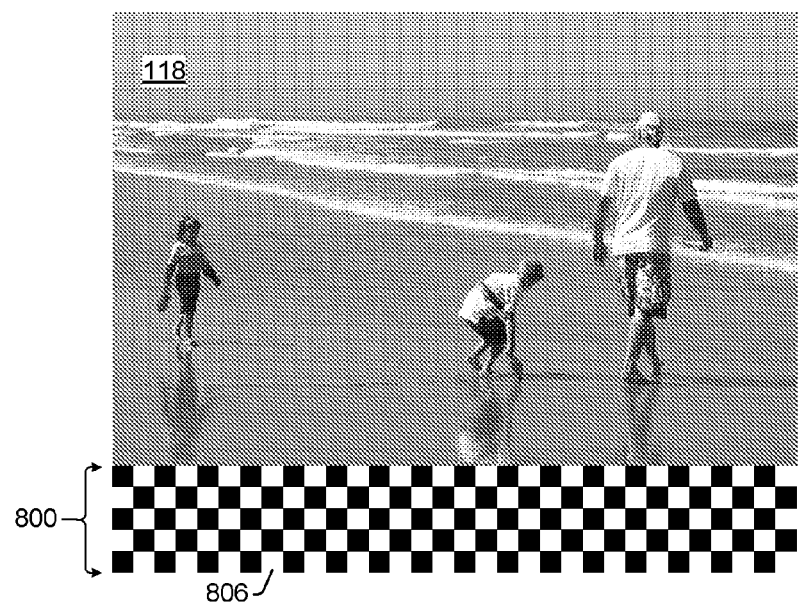
FIGS. 8*a* and 8*b* show an example of a graphical element implemented as a clip art pattern encoded with information that is combined and printed with an image.
Figure 8B:

FIGS. 8*a* and 8*b* show another example of a graphical element 120 implemented as a checker board clip art pattern 800 that has been encoded with embedding information 122 and combined with an image 118. FIG. 8*a* shows the checker board pattern 800 as it would appear to the human eye, while FIG. 8*b* shows an exaggerated version of the different luminance values within the pattern that are used to encode the information. In a manner similar to that discussed above regarding the border 120, the segments within the checker board pattern 800 can be encoded with a binary numerical value representing the embedding information 122 by varying one or more color space values between neighboring segments, such as luminance, chroma, or hue, within an LCH color space. Thus, a segment 802 might be solid black, encoding a binary value of "0", while a neighboring segment 804 might be solid dark grey, encoding a binary value of "1", and so on. In this implementation, where the segments (e.g., 802, 804) of the pattern 800 (i.e., graphical element 120) are not immediately adjacent to one another, the small gaps 806 or empty spaces between the segments help make the embedded information 122 imperceptible to the human eye.

In the example graphical element used in FIGS. 8*a* and 8*b*, the different luminance levels used to encode the information 122 create a barcode like feature that can be made to appear as a design element within the printed image product. Again, the image 118 itself is not altered by the inclusion of the graphical element or the information encoded within the graphical element. This method of encoding information into graphical elements such as clip art patterns enables a way to include the information with the printed image 118 in a visually unobtrusive manner.

Figure 9:
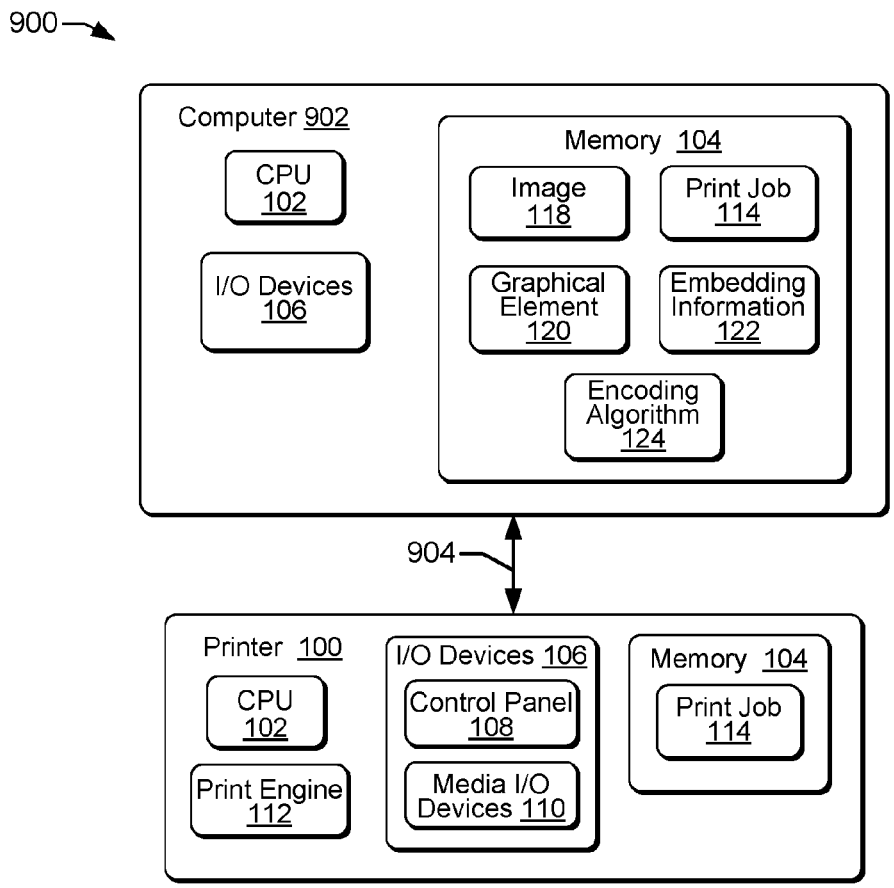
FIG. 9 shows a system implemented as a computer in communication with a printer that is suitable for encoding information into a graphical element of a printed image or other printed article.

FIG. 9 shows a system 900 implemented as a computer 902 in communication with a printer 100 that is suitable for encoding information into a graphical element of a printed image or other printed article. In system 900, printer 100 is configured in the same general manner as discussed above regarding FIG. 1. However, several components such as an image 118, a graphical element 120, embedding information 122, and encoding algorithm 124 may not be present on printer 100 of system 900. Instead, such components are stored and implemented on computer 902. Computer 902 is intended to represent any of a variety of conventional computing devices, such as a laptop, a desktop PC, a notebook or portable computer, a workstation, a mainframe computer, an Internet appliance, combinations thereof, and so on. Computer 902 and printer 100 are coupled through a network 904, and may be local or remote with respect to one another. Network 904 is intended to represent any of a variety of conventional network topologies and types (including optical, wired and/or wireless networks), employing any of a variety of conventional network protocols (including public and/or proprietary protocols). Network 904 may include, for example, a home network, a corporate network, cloud or the Internet, as well as one or more local area networks (LANs) and/or wide area networks (WANs) and combinations thereof. Network 904 may also include a cable or other suitable local communication link.

Computer 902 generally includes components of a standard computing device, such as one or more processors (CPU) 102, and a memory 104. A memory 104 typically includes both volatile (i.e., RAM) and nonvolatile (e.g., ROM, hard disk, floppy disk, CD-ROM, etc.) memory components. The memory components of memory 104 comprise non-transitory computer/processor-readable media that provide storage of computer/processor-executable coded instructions, such as program modules, applications, algorithms, data structures, and other data. Computer 902 also typically includes various input/output (I/O) devices 106, that may include, for example, a keyboard, a mouse, a touch-sensitive screen, a monitor, and so on.

Computer 104 may implement (i.e., by execution on a processor 102) various application programs (not shown), such as word processing applications, spreadsheet applications, image editing applications, web browsing applications, and so on. Such applications may generate print data (e.g., documents, spreadsheets, images) that is printable by printer 100 upon conversion of the data by a print driver into a suitably formatted print job 114. In some examples, computer 104 includes an encoding algorithm 124 that operates in a manner similar to that already discussed above with regard to printer 100 of FIG. 1. Thus, encoding algorithm 124 comprises instructions executable on processor 102 to encode and embed the embedding information 122 within a graphical element 120, and to combine the graphical element 120 with a printable image 118. The image 118, combined with the encoded graphical element 120 form a print job 114 which the computer 104 transfers to printer 100 for printing.

What is claimed is:

1. A non-transitory processor-readable medium storing code representing instructions that when executed by a processor cause the processor to:
   receive an image, a graphical element, and embedding information;
   partition the graphical element into segments to accommodate a binary numerical value that represents the embedding information, wherein segments of different color-space values comprise segments of different luminance values and wherein segments of different luminance values comprise a solid black segment having a luminance value of 0, a solid dark grey segment having a luminance value of 1, a black to grey gradient segment having a luminance value from 0 to 30, and a grey to black gradient segment having a luminance value from 30 to 0;
   pre-determine locations along the graphical element for placement of binary values from the binary numerical value; and
   encode the binary numeric value into the graphical element as a plurality of data carrying segments, the segments comprising a plurality of different color-space values.

2. A medium as in claim 1, wherein encoding the binary numeric value into the graphical element comprises encoding a "0" (zero) as a solid black segment and encoding a "1" (one) as a solid dark grey segment.

3. A medium as in claim 2, wherein encoding the binary numeric value into the graphical element further comprises including a transition segment in between a solid black segment and a solid dark grey segment.

4. A medium as in claim 1, wherein receiving a graphical element comprises receiving a border for the image.

5. A medium as in claim 1, wherein the instructions further cause the processor to adjust the shape and size of the graphical element to accommodate dimensions of the image.

6. A medium as in claim 1, wherein receiving a graphical element comprises receiving a graphical element from the group consisting of a border, a text box, and clip art.

7. A medium as in claim 1, wherein the instructions further cause the processor to combine the encoded graphical element and image within a print job.

8. A medium as in claim 1, wherein the color-space values are selected from the group consisting of LCH color-space values, LAB color-space values, and RGB color-space values.

9. A medium as in claim 7, wherein combining the encoded graphical element and image comprises combining the encoded graphical element and image without altering the image.

10. A medium as in claim 7, wherein combining the encoded graphical element and image comprises combining the encoded graphical element and image without covering a surface area of the image.

11. A printer comprising the medium of claim 1.

12. A computer comprising the medium of claim 1.

13. A non-transitory processor-readable medium storing code representing instructions that when executed by a processor cause the processor to:
    receive an image, a graphical element, and embedding information;
    encode a binary value representing the embedding information into the graphical element, wherein zeros and ones from the binary value are distinguished by a difference in luminance values applied to segments of the graphical element, wherein segments of different luminance values comprise a solid black segment having a luminance value of 0, a solid dark grey segment having a luminance value of 1, a black to grey gradient segment having a luminance value from 0 to 30, and a grey to black gradient segment having a luminance value from 30 to 0; and
    combine the encoded graphical element with the image without altering the image.

* * * * *